Figure 1:
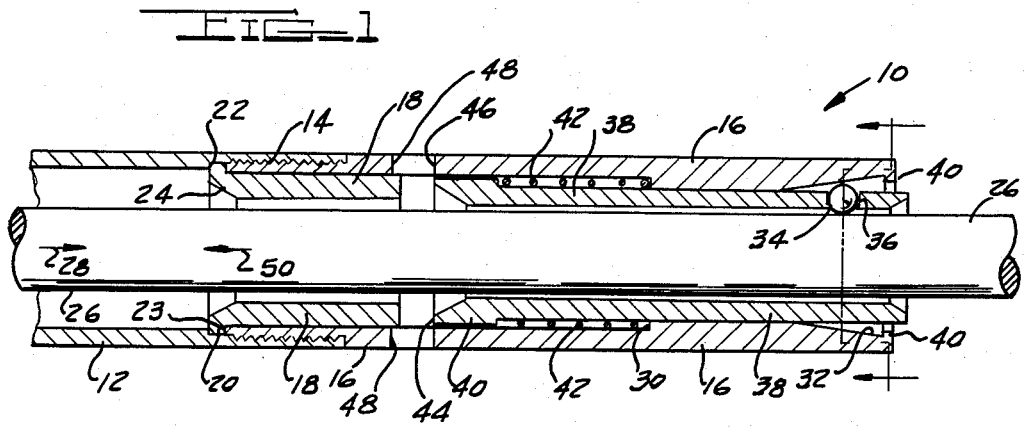

Nov. 8, 1960

G. MANOS 2,959,422

STOCK FEEDER

Filed Sept. 12, 1957

INVENTOR.
GUS MANOS
BY
Smith, Olsen, Lewis & McRae

United States Patent Office 2,959,422
Patented Nov. 8, 1960

2,959,422

STOCK FEEDER

Gus Manos, Dearborn, Mich., assignor to Albert Parigian

Filed Sept. 12, 1957, Ser. No. 683,542

2 Claims. (Cl. 279—30)

This invention relates to a stock feeder of the type disclosed in U.S. Patent 1,760,860. The feeder is particularly useful for feeding bar stock into automatic screw machines.

Objects of the invention are to provide a stock feeder wherein:

(1) The feeder has a positive grip on the stock so as to provide uniform feed in all spindles without special adjustments, thereby permitting a feed of any desired length in such manner as to reduce stock scrap, (2) The grip of the feeder on the stock is so secure as to prevent rebound of the stock from its "fed" position against the machine stop, whatever the stock length, (3) The grip of the feeder on the stock is "releasable" so as to permit withdrawal of the stock without forming any scratch marks on the stock, and (4) The feeder is of extremely low cost construction requiring a minimum number of parts and assembly operations.

Other objects of this invention will appear in the following description and appended claims, reference being had to the accompanying drawings forming a part of this specification wherein like reference characters designate corresponding parts in the several views.

Figure 2:
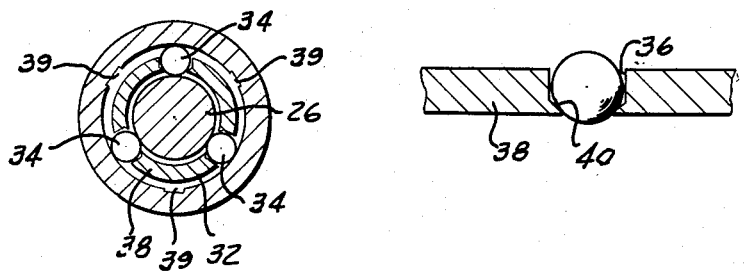
Figure 3:
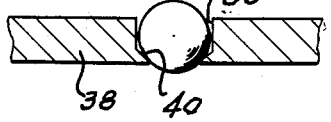

In the drawings:

Fig. 1 is a longitudinal sectional view through one embodiment of stock feeder constructed according to the invention, Fig. 2 is a sectional view on line 2—2 in Fig. 1, Fig. 3 is an enlarged view of a fragmentary portion of the structure shown in Fig. 1.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a stock feeding mechanism 10 including a pusher pipe 12 which corresponds to member 5 in the aforementioned U.S. Patent 1,760,860. Pipe 12 is internally threaded at 14 to meshingly and fixedly receive the adjacent threaded end portion of sleeve 16. A bushing 18 is positioned within sleeve 16 and is provided with an annular flange 20 which is locked between pipe shoulder 22 and the end surface 23 of the sleeve. The left end of bushing 18 is internally flared at 24 to guide bar stock 26 into the feeder when said stock is moved manually in the arrow 28 direction.

The left end portion of sleeve 16 is "internally recessed" as compared with the right end portion so as to form an annular shoulder 30. The extreme right end portion of sleeve 16 is formed with an outwardly diverging conical cam surface 32 which is rollably engaged by three steel or other similarly hard balls 34 retained in openings 36 in a tube 38. It will be noted from Fig. 3 that openings 36 are reduced in diameter at the inner surface of tube 38 so as to provide annular seats 40 for preventing the balls from dropping into the space within the tube when no stock is within the feeder.

The left end of tube 38 is provided with an annular enlargement 40. A compression spring 42 is positioned between enlargement 40 and shoulder 30 in such manner as to keep balls 34 in engagement with cam surface 32.

The left end surface 44 of tube 38 is in radial alignment with edges 46 of aligned holes 48 formed in sleeve 16, the arrangement being such that when a pin or other holding means (not shown) is inserted through either of the holes 48 into engagement with surface 44 balls 34 are prevented from gripping stock 26. In the Fig. 1 position of tube 38 (which it would take if a pin were inserted through hole 48) balls 34 are positioned sufficient distances outwardly of bar 26 to permit manual "retracting" movement of bar 26 in the arrow 50 direction without corresponding movement of feeder mechanism 10.

Feeding of bar stock 26 into the screw machine (not shown) is accomplished by forward movement of tube 12 in the arrow 28 direction. During this movement cam surface 32 forces balls 34 inwardly to securely grip stock 26; as a result stock 26 is carried with pipe 12 and sleeve 16 without any slippage therebetween.

After the stock has been fed into the machine and gripped by the usual spring collet (not shown) pipe 12 of the feeder mechanism can be retracted in the arrow 50 direction without any corresponding movement of the stock. During this movement of pipe 12 sleeve 16 has a slight leftward movement relative to tube 38 such as to permit outward movement of balls 34 on cam surface 32 whereby to allow the balls to roll on the stock surface without imparting any scratches onto the stock. Spring 42 is of fairly light construction so as to offer only slight resistance to outward movement of the balls on surface 32, the only purpose of the spring being to insure continual engagement of the balls with the conical surface.

It will be noted that the illustrated apparatus permits three different motions, each being of value in certain instances or situations. These motions are:

(1) Feeding of bar stock 26 in the arrow 28 direction by a "push" on pipe 12, (2) Retraction of the pipe 12, sleeve 16 and tube 38 in the arrow 50 direction without corresponding movement of stock 26, and (3) Withdrawal of stock 26 in the arrow 50 direction without movement of pipe 12, sleeve 16 or tube 42.

The stock feeder structure may have its component parts assembled together quickly and easily. Thus, tube 38 may be inserted into the left end of sleeve 16, after which bushing 18 may be inserted into the left end of sleeve 16 as illustrated in Fig. 1. Balls 34 are placed in openings 36 after tube 38 has been positioned within sleeve 16. Placement of the balls is effected by forcing tube 38 in the arrow 28 direction (against the action of spring 42) so as to put openings 36 to the right of sleeve 16. Thereafter the balls may be placed in openings 36 and tube 38 rotated within sleeve 16 to align balls 34 with cut outs 39 in end flange 40. Subsequently, the spring action is permitted to carry tube 38 to its illustrated position within sleeve 16.

Tube 38 may then be rotated within the sleeve to put balls 34 out of axial alignment with cut outs 39 so as to preclude the possibility of the balls working out of openings 36 (as by rightward movement of tube 38 against the action of spring 42). However spring 42, under normal circumstances, will retain tube 34 against excessive rightward movement so that flange 40 is not absolutely necessary to the attainment of an operative structure.

I claim:

1. A stock feeder comprising a pusher pipe; a sleeve extending axially from said pipe; the end portion of the sleeve adjacent the pipe being internally recessed to form a shoulder at a point intermediate the sleeve length; the other internal end portion of said sleeve diverging outwardly to form a conical cam surface; a tube within said sleeve having an enlargement at the end portion thereof within the internally recessed portion of the sleeve; a compression spring between said enlargement and the aforementioned shoulder; a hole in the sleeve at a point adjacent said tube enlargement, whereby to be adapted for reception of a holding member for preventing movement of the tube past the hole under the compulsion of the compression spring; a plurality of circumferentially spaced openings in the other end portion of said tube; and balls rollably seated in said openings and projecting beyond both of the tube surfaces so as to be adapted for engagement with the conical cam surface and stock; whereby, when stock is positioned within the tube, movement of the sleeve in one direction causes the conical cam surface to force the balls inwardly so as to grip the stock, and movement of the sleeve in the opposite direction causes the balls to move outwardly on the cam surface so as to release their grip on the stock; an edge of the hole being in radial alignment with an end surface of the tube when the balls are free to rollably engage the stock, whereby when a holding member is inserted through the hole into the path of the end surface the stock may be removed from the feeder without scratching of the stock surface.

2. The combination of claim 1 wherein an end portion of the pusher pipe is internally threaded to define an internal shoulder, and the adjacent end portion of the sleeve is provided with external threads in meshing engagement with the pusher pipe threads; the combination further comprising a stock-guiding bushing positioned within the sleeve and having a flange fitting in the joint between said internal shoulder and sleeve.

References Cited in the file of this patent

UNITED STATES PATENTS

| | | |
|---|---|---|
| 1,547,706 | Whitmore et al. | July 28, 1925 |
| 1,714,684 | Malcolm | May 28, 1929 |
| 1,760,860 | Minnier et al. | May 27, 1930 |
| 2,111,308 | Baxendale | Mar. 15, 1938 |